US008404026B2

(12) United States Patent
Bookbinder et al.

(10) Patent No.: US 8,404,026 B2
(45) Date of Patent: Mar. 26, 2013

(54) FLOW-THROUGH SUBSTRATES AND METHODS FOR MAKING AND USING THEM

(75) Inventors: Dana Craig Bookbinder, Corning, NY (US); Steven Bolaji Ogunwumi, Painted Post, NY (US); David Lambie Tennent, Campbell, NY (US); Ralph Edward Truitt, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 375 days.

(21) Appl. No.: 12/840,542

(22) Filed: Jul. 21, 2010

(65) Prior Publication Data

US 2012/0020855 A1    Jan. 26, 2012

(51) Int. Cl.
B01D 53/64 (2006.01)
B01J 20/18 (2006.01)

(52) U.S. Cl. ............................................. 95/133; 95/134

(58) Field of Classification Search .................. 95/133, 95/134, 902; 96/153, 154; 502/60, 77–79, 502/439; 110/345; 210/660, 688
See application file for complete search history.

(56) References Cited

U.S. PATENT DOCUMENTS

| | | | |
|---|---|---|---|
| 4,414,111 A | 11/1983 | Iwaisako et al. | 210/500.2 |
| 4,874,525 A | 10/1989 | Markovs | |
| 5,463,167 A | 10/1995 | Ou | 585/823 |
| 5,773,659 A * | 6/1998 | Fukatsu et al. | 564/479 |
| 6,080,319 A | 6/2000 | Alther | 210/679 |
| 6,107,354 A | 8/2000 | Shaniuk et al. | 521/28 |
| 6,136,749 A | 10/2000 | Gadkaree et al. | 502/183 |
| 6,200,483 B1 | 3/2001 | Cutler et al. | 210/685 |
| 6,258,334 B1 | 7/2001 | Gadkaree et al. | 423/210 |
| 6,420,295 B1 * | 7/2002 | Wu et al. | 502/71 |
| 6,652,627 B1 | 11/2003 | Tonkovich et al. | 95/104 |
| 6,770,119 B2 | 8/2004 | Harada et al. | 95/92 |
| 6,780,805 B2 | 8/2004 | Faber et al. | 502/66 |
| 6,962,617 B2 * | 11/2005 | Simpson | 95/134 |
| 7,022,158 B2 | 4/2006 | Seguin et al. | 95/90 |
| 7,033,419 B1 | 4/2006 | Granite et al. | 95/134 |
| 7,048,781 B1 | 5/2006 | Lovell | 95/134 |
| 7,288,499 B1 | 10/2007 | Lovell et al. | 502/80 |
| 7,309,676 B2 | 12/2007 | Mouri et al. | 502/60 |
| 7,429,330 B2 | 9/2008 | Vo et al. | 210/667 |
| 7,429,551 B2 | 9/2008 | Vo | 502/406 |
| 7,504,080 B2 | 3/2009 | Yao et al. | 423/210 |
| 7,520,994 B2 | 4/2009 | Dong et al. | 210/661 |
| 7,572,420 B2 | 8/2009 | Honjo et al. | 423/210 |
| 7,597,864 B2 | 10/2009 | Breen et al. | 423/212 |
| 2004/0013589 A1 * | 1/2004 | Vosteen et al. | 423/210 |
| 2005/0106267 A1 | 5/2005 | Frykman et al. | 424/684 |
| 2005/0201916 A1 | 9/2005 | Yavuz et al. | 423/239.2 |
| 2007/0125684 A1 * | 6/2007 | Biesmans et al. | 208/108 |
| 2008/0156194 A1 * | 7/2008 | Witham et al. | 96/154 |
| 2008/0236389 A1 | 10/2008 | Leedy et al. | 95/95 |
| 2008/0279739 A1 * | 11/2008 | Cross et al. | 423/235 |
| 2008/0286176 A1 | 11/2008 | Schirmeister et al. | 422/198 |
| 2009/0000475 A1 | 1/2009 | Fekety et al. | 95/105 |
| 2009/0069176 A1 | 3/2009 | Hernandez et al. | 502/401 |
| 2009/0143221 A1 | 6/2009 | Ogunwumi et al. | 502/67 |
| 2009/0176053 A1 | 7/2009 | Miyairi et al. | 428/116 |
| 2010/0018395 A1 * | 1/2010 | Srinivasachar et al. | 95/134 |

FOREIGN PATENT DOCUMENTS

| | | |
|---|---|---|
| EP | 0361681 A1 | 8/1989 |
| EP | 0775518 A2 | 5/1997 |
| EP | 0897738 A1 | 2/1999 |
| FR | 2836063 A1 | 8/2003 |
| JP | 2002-177770 | 6/2002 |
| WO | 03/051488 | 6/2003 |
| WO | 2004/080574 | 9/2004 |
| WO | 2007/133487 | 11/2007 |
| WO | 2007/133492 | 11/2007 |
| WO | 2007/133568 | 11/2007 |
| WO | 2008/070988 | 6/2008 |

OTHER PUBLICATIONS

Machine generated English translation of EP0775518 A2, published May 1997.*
PCT/US2011/043677 Search Report and Written Opinion.
"Zeolites Synthesized from Class F Fly Ashand Sodium Aluminate Slurry"; Grutzeck, et al; Journal of American Ceramic Society; Abstract.
"Zeolitic Host-Guest Interactions and Building Blocks for the Self-Assembly of Complex Materials"; Thomas Bein; MRS Bulletin; vol. 30; Oct. 2005; p. 713-720.
"Heading to Market With MOFs"; Mitch Jacoby; Chemical & Engineering News; Aug. 25, 2008; vol. 86; No. 34; pp. 13-16.
"Nanotechnology and Water Treatment: Applications and Emerging Opportunities"; Theron et al; Critical Reviews in Microbiology; 2008; vol. 34; No. 1; pp. 43-69.
"Adsorption and Catalytic Oxidation of Gaseous Elemental Mercury in Flue Gas over MnO2/Alumina"; Qiao et al; Ind. Eng. Chem. Res. vol. 48; No. 7, 2009; p. 3317-3322.
"Spectroscopy of Cobalt-Ethylenediamine-Oxygen Adducts in the Supercages of Zeolites"; Schoonheydt et al; J.C.S. Dalton; p. 914-922; 1981.
"Synthesis of metal sulphide materials with controlled architecture"; Scott et al; Current Opinion in Solid State and Materials Science 4 (1999) 113-121; Published by Elsevier Science Ltd.
"Bench-scale experimental evaluation of carbon performance on mercury vapour adsorption"; Science Direct; Fuel 83(2004) 2401-2409; Yan et al.
"A Novel Process for Hg Removal from Gases"; Ind. Eng. Chem. Res. 1994, 33, 3010-3014; Tsoung Y. Yan.
"Atlas of Zeolite Structure Types"; Meier et al; Third Revised Edition; Published on behalf of the Structure Commission of the International Zeolite Association; pp. 1-200.

* cited by examiner

Primary Examiner — Frank Lawrence, Jr.
(74) Attorney, Agent, or Firm — Jason A. Barron; Lisa M. Noni

(57) ABSTRACT

Flow-through substrates, such as honeycombs, comprising certain zeolites. The flow-through substrates may be used, for example, in the removal of a heavy metal from a fluid such as a gas stream.

12 Claims, No Drawings

FLOW-THROUGH SUBSTRATES AND METHODS FOR MAKING AND USING THEM

FIELD OF THE DISCLOSURE

This disclosure relates to a flow-through substrate, such as a honeycomb, useful, for example, in the removal of a heavy metal from a fluid.

BACKGROUND

Emissions of heavy metals have become environmental issues of increasing importance because of the potential dangers to human health. During coal and municipal solid waste combustion, for instance, some heavy metals are transferred into the vapor phase due to their high volatility. Once discharged to the atmosphere, heavy metals may persist in the environment and create long-term contamination.

Many currently proposed pollution abatement technologies are not capable of effectively controlling gas phase emissions of heavy metals, particularly from flue gas emissions in the utility industry. For example mercury emission control technologies such as adsorption using various absorbents, direct carbon injection, flue gas desulfurization technologies (FGD), wet scrubbers, wet filtration, etc. are still limited to research stages.

SUMMARY

The present inventors have now made new materials useful, for example, for the capture of heavy metals from fluids without the use of sulfur. Embodiments of the invention relate to a flow-through substrate, such as a honeycomb, which is essentially free of sulfur and comprises a zeolite having a minimum channel opening of greater than or equal to 3.0 angstroms. The flow-through substrate may be used, for example, in the removal of a heavy metal from a fluid such as a gas stream.

DESCRIPTION OF EMBODIMENTS

A first embodiment of the invention is a flow-through substrate comprising a zeolite having a minimum channel opening of greater than or equal to 3.0 angstroms and a cation selected from an alkali metal, an alkaline earth metal, hydrogen and ammonium, wherein the flow-through substrate is essentially free of sulfur.

A second embodiment is a flow-through substrate comprising a zeolite impregnated with a chelating compound.

A third embodiment is a method of removing a heavy metal from a fluid, the method comprising providing a flow-through substrate which is essentially free of sulfur and comprises a zeolite having a minimum channel opening of greater than or equal to 3.0 angstroms; and contacting the fluid comprising a heavy metal with the flow-through substrate.

Exemplary flow-through substrates in any of the embodiments of the invention include substrates comprising a glass, glass-ceramic, ceramic, inorganic cement, metal, or polymer, including combinations thereof. Some example substrate materials include cordierite, mullite, clay, magnesia, metal oxides, talc, zircon, zirconia, zirconates, zirconia-spinel, magnesium alumino-silicates, spinel, zeolite, alumina, silica, silicates, borides, alumina-titanate, alumino-silicates, e.g., porcelains, lithium aluminosilicates, alumina silica, feldspar, titania, fused silica, nitrides (e.g. silicon nitride), borides, carbides (e.g. silicon carbide), silicon nitride, metal carbonates, metal phosphates, wherein the metal can be, for example, Ca, Mg, Al, B, Fe, Ti, Zn, or combinations of these.

Additional examples of inorganic cements include Portland cement blends, for example Portland blast furnace cement, Portland flyash cement, Portland pozzolan cement, Portland silica fume cement, masonry cements, expansive cements, white blended cements, colored cements, or very finely ground cements; or non-Portland hydraulic cements, for example pozzolan-lime cements, slag-lime cements, supersulfated cements, calcium aluminate cements, calcium sulfoaluminate cements, natural cements, or geopolymer cements.

Exemplary flow-through substrates in any of the embodiments of the invention may also include polymer substrates. The polymer substrates may be linear or cross-linked and may include, for example, organic polymers, such as epoxies, polyamides, polyimides or phenolic resins, or silicone polymers, such as methyl or phenyl silicones, and combinations thereof.

The flow-through substrates, which may be porous, may comprise one or more coatings of, for instance, inorganic material, which may also be porous. Coatings of inorganic material may be provided as washcoats of inorganic material. Exemplary inorganic coating materials include cordierite, alumina (such as alpha-alumina and gamma-alumina), mullite, aluminum titinate, titania, zirconia, ceria particles, silica, zeolite, and mixtures thereof.

In some embodiments, the flow-through substrate comprises a surface having a surface area of 100 $m^2/g$ or more, 200 $m^2/g$ or more, 300 $m^2/g$ or more, 400 $m^2/g$ or more, or 500 $m^2/g$ or more.

The term "flow-through substrate" as used herein is a shaped body comprising inner passageways, such as straight or serpentine channels and/or porous networks that would permit the flow of a fluid stream through the body. The flow-through substrate comprises a dimension in the flow-through direction of at least 1 cm, at least 2 cm, at least 3 cm, at least 4 cm, at least 5 cm, at least 6 cm at least 7 cm, at least 8 cm, at least 9 cm, or at least 10 cm from the inlet to the outlet.

In some embodiments, the flow-through substrate has a honeycomb structure comprising an inlet end, an outlet end, and inner channels extending from the inlet end to the outlet end. In some embodiments, the honeycomb comprises a multiplicity of cells extending from the inlet end to the outlet end, the cells being defined by intersecting cell walls. The honeycomb substrate could optionally comprise one or more selectively plugged honeycomb substrate cell ends to provide a wall flow-through structure that allows for more intimate contact between the fluid stream and cell walls.

The flow-through substrate may be made using any suitable technique. For example, the flow-through substrate may be made by preparing a batch mixture, extruding the mixture through a die forming a honeycomb shape, drying, and optionally firing the flow-through substrate.

The batch mixture can be comprised, for example, of a combination of inorganic batch materials sufficient to form a desired sintered phase ceramic composition including, for example, a predominant sintered phase composition comprised of ceramic, glass-ceramic, glass and combinations thereof. It should be understood that, as used herein, combinations of glass, ceramic, and/or glass ceramic compositions includes both physical and/or chemical combinations, e.g., mixtures or composites. Example batch mixture materials include, for example, glass, glass-ceramic, ceramic, or inorganic cement materials mentioned above in the context of the composition of the flow-through substrate. In some embodiments the batch mixture may comprise oxide glass; oxide ceramics; or other refractory materials. Exemplary and non-limiting inorganic materials suitable for use in an inorganic batch mixture can include oxygen-containing minerals or salts, clay, zeolites, talc, cordierite, titanates, aluminum titanate, mullite, magnesium oxide sources, zircon, zirconates, zirconia, zirconia spinel, spinel, alumina forming sources, including aluminas and their precursors, silica forming sources, including silicas and their precursors, silicates, aluminates, aluminosilicates, kaolin, flyash, lithium aluminosilicates, alumina silica, aluminosilicate fibers, magnesium aluminum silicates, alumina trihydrate, feldspar, boehmite, attapulgites, titania, fused silica, nitrides, carbides, carbonates, borides, (e.g. silicon carbide, silicon nitride), or combinations of these.

It should be understood that the inorganic batch mixture can further comprise one or more additive components. In some embodiments, the inorganic batch mixture can comprise an inorganic binder, such as for example, a borosilicate glass.

The binder component can include organic binders, inorganic binders, or a combination of both. Suitable organic binders include water soluble cellulose ether binders such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, methylcellulose derivatives, hydroxyethyl acrylate, polyvinylalcohol, and combinations thereof.

In some embodiments, the flow-through substrate may comprise fibrous fillers, for example, ceramic, glass or metal fibers or whiskers.

One liquid vehicle for providing a flowable or paste-like consistency to the batch mixture is water, although it should be understood that other liquid vehicles exhibiting solvent action with respect to suitable temporary organic binders could be used. The amount of the liquid vehicle component can vary in order to impart optimum handling properties and compatibility with other components in the batch mixture.

In addition to a liquid vehicle and binder, the batch mixture can also comprise one or more optional forming or processing aids. Exemplary forming or processing aids or additives can include lubricants, ionic surfactants, plasticizers, and sintering aids. Exemplary lubricants can include hydrocarbon acids, such as, stearic acid or oleic acid, sodium stearate, petroleum oils with molecular weights from about 250 to 1000, containing paraffinic and/or aromatic and/or alicyclic compounds. Other useful oils are 3 in 1 oil from 3M Co., or 3 in 1 household oil from Reckitt and Coleman Inc., Wayne, N.J., synthetic oils based on poly (alpha olefins), esters, polyalkylene glycols, polybutenes, silicones, polyphenyl ether, CTFE oils, and other commercially available oils. Vegetable oils such as sunflower oil, sesame oil, peanut oil, soybean oil etc. are also useful. An exemplary plasticizer can include glycerine.

Example flow-through substrates are disclosed in U.S. Pat. Nos. 3,885,977 and 3,790,654, the contents of both being incorporated by reference herein.

In some embodiments, the flow-through substrate is essentially free of sulfur. The term "sulfur" in this context includes elemental sulfur and sulfur-containing compounds. In some of those embodiments, the flow-through substrate comprises no sulfur. In other of those embodiments, the flow-through substrate comprises less than 1%, less than 0.5%, or less than 0.1% by weight of sulfur, calculated on the basis of sulfur atoms in the case of sulfur-containing compounds.

In some embodiments, the flow-through substrate is essentially free of activated carbon. In some of those embodiments, the flow-through substrate comprises no activated carbon. In other of those embodiments, the flow-through substrate comprises less than 10%, less than 5%, less than 3%, less than 1%, or less than 0.1% by weight of activated carbon.

In some embodiments, the flow-through substrate is coated with a coating that comprises a zeolite. The term "coating" as used herein means that a zeolite is disposed on an exposed surface of the flow-through substrate. The coating may coat all or a portion of the surface of the flow-through substrate, and may impregnate the substrate to any extent if the surface of the substrate is porous. For instance, the coating may coat the inner channel surfaces of a flow-through substrate and any outer surfaces of the flow-through substrate. In some embodiments, the zeolite is in the form of an uninterrupted and continuous coating over all or a portion of the surface of the flow-through substrate. In other embodiments, the coating of zeolite comprises cracks, pinholes, or any other discontinuities. The coating may further comprise any other suitable materials in addition to the zeolite.

In some embodiments, at least a portion of the zeolite is chemically bound to at least a portion of flow-through substrate. The term "at least a portion" in this and other contexts refers to some or all of the material being described. Thus, in these embodiments, some or all of the zeolite can be chemically bound to some or all of the flow-through substrate.

In some embodiments, the zeolite is distributed homogeneously throughout the flow-through substrate, such as when included in the batch mixture.

Zeolites have three-dimensional crystalline frameworks of tetrahedral silica or alumina anions strongly bonded at all corners. The zeolite structures contain (—Si—O—Al—) linkages that form surface pores of uniform diameter and enclose regular internal cavities and channels of discrete sizes and shapes, depending on the chemical composition and crystal structure of the specific zeolite involved. The enclosed cavities may contain cations that are loosely bound to the lattice and thus can engage in ion exchange.

Embodiments comprise a zeolite having a minimum channel opening of greater than or equal to 3.0 angstroms, for example, a minimum channel opening greater than or equal to 5.0 angstroms, greater than or equal to 6.0 angstroms or greater than or equal to 7.0 angstroms. A minimum channel opening of greater than or equal to 3.0 angstroms means the zeolite has no channel with an opening of less than 3.0 angstroms. For example, mordenite has channel openings of 6.5 by 7.0 angstroms and 2.6 by 5.7 angstroms therefore having at least one channel opening of less than 3.0 angstroms. In some embodiments, the channel openings are greater than or equal to 3.0 angstroms and less than 20 angstroms.

Examples of channel openings in various zeolite frameworks can be found in the Atlas of Zeolite Structure Types (Meier, W. M. and Olson, D. H. London: Butterworth-Heinemann, 1992), which is incorporated by reference herein.

In some embodiments, the zeolite has a $SiO_2/Al_2O_3$ mole ratio of 5 or more, for example 30 or more, 60 or more, 80 or more, 90 or more, or 100 or more.

In some embodiments, the zeolite is selected from A-type zeolite, X-type zeolite, Y-type zeolite, L-type zeolite, ZSM-5, and combinations thereof.

In some embodiments, the zeolite may contain a cation selected from an alkali metal, an alkaline earth metal, hydrogen, sodium, iron, potassium, calcium, and ammonium.

In some embodiments, the zeolite may be impregnated with a chelating compound. The chelating compound may be, for example, an organic chelate, such as EDTA.

The zeolite itself may comprise a defined surface area, such as a surface area ranging from 0.01 m²/g to 500 m²/g. In some embodiments, the zeolite has a surface area of 300 m²/g or less, 200 m²/g or less, 100 m²/g or less, 50 m²/g or less, 10 m²/g or less, or 5 m²/g or less.

The flow-through substrate may be made by any suitable technique. In some embodiments, the flow-through substrate may be made by a method comprising mixing the zeolite having a minimum channel opening of greater than 3.0 angstroms with batch mixture to provide a zeolite containing batch mixture; and forming the zeolite containing batch mixture into a flow-through substrate.

In another embodiment, the flow-through substrate may be made by a method comprising providing a flow-through substrate; coating the flow-through substrate with a zeolite having a minimum channel opening of 3.0 angstroms.

The flow-through substrate can be coated with the zeolite by any suitable technique such as by applying a washcoat comprising a solution or suspension of the zeolite to the flow-through substrate. As examples, the zeolite can be applied by dipping the flow-through substrate in a solution or suspension comprising the zeolite or spraying a solution or suspension comprising the zeolite on the flow-through substrate.

The eventual quantity of zeolite formed on the flow-through substrate is dependent on the amount of zeolite that is retained by the flow-through substrate. The amount of zeolite retained by the flow-through substrate can be increased e.g., by contacting the flow-through substrate with the zeolite more than once and allowing the flow-through substrate to dry between contacting steps. In addition, the amount of zeolite retained by the substrate can be controlled by simply modifying the overall porosity of the flow-through substrate (e.g., increasing porosity will increase the amount of zeolite retained by the flow-through substrate).

Any flow-through substrates of the invention, such as honeycombs, may be used, for example, for the sorption of any contaminant from a fluid through contact with the fluid. For example, a fluid stream may be passed through inner passageways of a coated flow-through substrate from the inlet end to the outlet end. The fluid stream may be in the form of a gas or a liquid. The gas or liquid may also contain another phase, such as a solid particulate in either a gas or liquid stream, or droplets of liquid in a gas stream. Example gas streams include coal combustion flue gases (such as from bituminous and sub-bituminous coal types or lignite coal) and syngas streams produced in a coal gasification process.

In some embodiments, the temperature of the fluid stream is in the range of from 100° C. to 300° C., for example, 150° C., 200° C., or 250° C.

The terms "sorb," "sorption," and "sorbed," refer to the adsorption, sorption, or other entrapment of the contaminant on the coated flow-through substrate, either physically, chemically, or both physically and chemically.

Contaminants to be sorbed include, for instance, contaminants at 3 wt % or less within the fluid stream, for example at 2 wt % or less, or 1 wt % or less. Contaminants may also include, for instance, contaminants at 10,000 μg/m³ or less within the fluid stream. Example contaminants include heavy metals. The term "heavy metal" and any reference to a particular metal by name herein includes the elemental forms as well as oxidation states of the metal. Sorption of a heavy metal thus includes sorption of the elemental form of the metal as well as sorption of any organic or inorganic compound or composition comprising the metal.

Example heavy metals that can be sorbed include cadmium, mercury, chromium, lead, barium, beryllium, and chemical compounds or compositions comprising those elements. For example, the metal mercury may be in an elemental (Hg°) or oxidized state (Hg⁺ or $Hg^{2+}$). Example forms of oxidized mercury include HgO and halogenated mercury, for example $Hg_2Cl_2$ and $HgCl_2$. Other exemplary metallic contaminants include nickel, cobalt, vanadium, zinc, copper, manganese, antimony, silver, and thallium, as well as organic or inorganic compounds or compositions comprising them. Additional contaminants include arsenic and selenium as elements and in any oxidation states, including organic or inorganic compounds or compositions comprising arsenic or selenium.

If elemental mercury is present in the fluid stream, the fluid stream may be contacted with an oxidizing flow-through substrate. The oxidizing flow-through substrate is suitable for oxidizing at least a portion of the elemental mercury present in the fluid stream. In some embodiments this step takes place prior to contacting the fluid with the flow-through substrate comprising zeolite. For example, the oxidizing flow-through substrate may be placed in the fluid stream prior to the flow-through substrate comprising zeolite. The oxidizing flow-through substrate may comprise $MnO_2$, MnO, $CeO_2$, or other transition metals. In some embodiments the oxidizing flow-through substrate is a Cormetech $TiO_2$—$V_2O_5$ catalyst substrate. In other embodiments, the flow-through substrate comprising zeolite may additionally comprise oxidizing metals, for example, $Ce^{n+}$, $V^{n+}$, $Mn^{n+}$, or $Ti^{n+}$ that will function to oxidize elemental mercury present in the fluid stream.

Sorption of $Hg^{n+}$ occurs via cation exchange. $Hg^{n+}$ present in the fluid stream switches places with the cation present in the zeolite. In some embodiments, the $Hg^{n+}$ forms a complex with the zeolite, becoming trapped in the zeolite cavity.

The contaminant may be in any phase that can be sorbed on the composite. Thus, the contaminant may be present, for example, as a liquid in a gas fluid steam, or as a liquid in a liquid fluid stream. The contaminant could alternatively be present as a gas phase contaminant in a gas or liquid fluid stream.

The flow-through substrates of the invention, such as honeycombs, may be incorporated into or used in any appropriate system environments.

EXAMPLES

Table 1 lists zeolite data for examples 1-14. Zeolites for examples 4 and 7 were supplied by Tosoh America, Grove City, Ohio; the remaining zeolites were supplied by Zeolyst International, Conshohocken, Pa. Zeolite granules for Example 1 were prepared as follows: 40 grams of Zeolite Y powder (FAU) CBV 100, sodium cation, with silica to alumina ratio of 5.1 (supplied by Zeolyst International, Conshohocken, Pa.) was mixed with 20 grams of colloidal alumina (product code AL20, 20% $Al_2O_3$, pH~3.8, supplied by Nyacol Nano Technologies, Inc., Ashland, Mass.) along with 50 grams DI water. The resulting slurry was blended in small blender for two minutes in two intervals yielding well mixed slurry. The slurry was transferred to a Pyrex glass dish and placed in a 125° C. air recirculating oven for 16 hours to dry the material. The dried zeolite material was placed in a quartz crucible and heated at 100° C./hr to 550° C. and held for 5 hours then cooled to room temperature. The fired material was ground and sieved to −35/+140 mesh or −35/+80 mesh as shown in Table 2. The other examples of zeolite granules follow this same procedure and contain the amounts of zeolite, colloidal alumina, and water as seen in Table 2.

TABLE 1

| Exam | Zeolite type/ product code | SiO2/Al2O3 Mole ratio | cation form in zeolite as-used for Hg capture | Na2O weight % | Channel size, Angstroms | Surface area m^2/g |
|---|---|---|---|---|---|---|
| 1 | Zeolite Y (FAU)/ CBV100 | 5.1 | sodium | 13.00 | 7.4 equidistant | 900 |
| 2 | Zeolite Y (FAU)/ CBV712 | 12 | hydrogen | 0.05 | 7.4 equidistant | 730 |
| 3 | Zeolite Y (FAU)/ CBV780 | 80 | hydrogen | 0.03 | 7.4 equidistant | 780 |
| 4 | Zeolite Y (FAU)/ HSZ 350 HUA | 10 | hydrogen | <0.2 | 7.4 equidistant | 600 |
| 5 | Beta zeolite (BEA)/ CP814E | 25 | hydrogen | 0.05 | 7.6 × 6.4/ 5.5 × 5.5 | 680 |
| 6 | Beta zeolite (BEA)/ CP811C-300 | 360 | hydrogen | 0.05 | 7.6 × 6.4/ 5.5 × 5.5 | 620 |
| 7 | Beta zeolite (BEA)/ HSZ 930 HA | 27 | hydrogen | <0.05 | 7.6 × 6.4/ 5.5 × 5.5 | 630 |
| 8 | ZSM-5 (MFI)/ CBV3024E | 30 | hydrogen | 0.05 | 5.3 × 5.6/ 5.1 × 5.5 | 400 |
| 9 | ZSM-5 (MFI)/ CBV28014 | 280 | hydrogen | 0.05 | 5.3 × 56/ 5.1 × 5.5 | 400 |
| 10 | ZSM-5 (MFI)/ CBV28014 | 280 | ammonium | 0.05 | 5.3 × 5.6/ 5.1 × 5.5 | 400 |
| 11 | ZSM-5 (MFI)/ ZD07026 | 30 | iron | 0.05 | 5.3 × 5.6/ 5.1 × 5.5 | 400 |
| 12 | ZSM-5 (MFI)/ CBV 3020 | 30 | hydrogen | 0.05 | 5.3 × 5.6/ 5.1 × 5.5 | 400 |
| 13 | ZSM-5 (MFI)/ CBV 3002 | 300 | hydrogen | 0.05 | 5.3 × 5.6/ 5.1 × 5.5 | 400 |
| 14 | ZSM-5 (MFI)/ CBV 10002 | 1000 | hydrogen | 0.05 | 5.3 × 5.6/ 5.1 × 5.5 | 400 |

TABLE 2

| Example | Weight of zeolite (g) | Weight of AL20 (g) | Weight of DI water (g) | Form | weight | Hg captured (% reduction of total inlet Hg) (note "c") |
|---|---|---|---|---|---|---|
| 1 | 40 | 20 | 50 | granule | 1.0 g | 94 |
| 2 | 40 | 20 | 50 | granule | 1.0 g | 96 |
| 3 | 40 | 20 | 50 | granule | 1.0 g (note "a") | 76 |
| 4 | 40 | 20 | 50 | granule | 1.0 g (note "d") | 90 |
| 5 | 31.5 | 17.5 | 122 | granule | 1.0 g (note "d") | 85 |
| 6 | 40 | 20 | 100 | granule | 1.0 g | 95 |
| 7 | 40 | 20 | 50 | granule | 1.0 g (note "d") | 93 |
| 8 | 40 | 20 | 50 | granule | 1.0 g (note "d") | 82 |
| 9 | 40 | 20 | 50 | granule | 1.0 g (note "d") | 86 |
| 10 | see note "b" | | | powder | 0.10 g (note "b") | 72 |
| 11 | 40 | 20 | 50 | granule | 1.0 g | 98 |
| 12 | 40 | 20 | 50 | granule | 1.0 g | 97 |
| 13 | 40 | 20 | 50 | granule | 1.0 g (note "d") | 89 |
| 14 | 40 | 20 | 50 | granule | 1.0 g (note "d") | 87 |

Notes:
a-granule with 10% Al20 binder, −35 to +80 mesh, fired to 550 C. in air for 4 hours
b-as-received powder (not fired) dispersed in cordierite granules −35 to +140 mesh
c-Hg captured from simulated flue gas
d-granule with 10% Al20 binder, −35 to +110 mesh, fired to 550 C. in air for 4 hours Test samples for examples 1-14 were prepared as follows: Quartz tubing purchased from National Scientific Co., Inc. (Quakertown Pa.), as 7.00 mm ID×9.50 mm OD tubing. The tubing was cut into 15 cm lengths with an indentation flame worked about 3 cm from one end. The indentation protruded approximately half way through the tube and acted as a stopper for the quartz wool and powder sample packed in the tube. Each end of the tube was flame polished resulting in a smooth surface. Next, quartz wool (Grace Davidson Discovery Sciences, Deerfield, Ill., product code 4033) was pushed into the tube using a disposable wooden rod; sufficient wool was used to occupy about 2 cm length of the tube. The tubes for examples 1-9 and 11-14 were then filled with 1.0 grams of zeolite granules as described above and in Tables 1 and 2. The tube for example 10 was filled with 0.10 grams of zeolite ZSM-5 CBV28014 powder dispersed with 1.0 grams of granulated cordierite (−35/+140 mesh, 50% porosity by volume). Quartz wool was then packed on top of the zeolite granules or cordierite/zeolite material to within about 1 cm of the end of the tube. Samples had less than 3 psi pressure drop while flowing 750 ml/minute of $N_2$ gas.

Examples 1-14

Elemental Mercury Sorption ($Hg^0$) from Simulated Flue Gas

Simulated flue gases were generated by mixing water vapor, mercury, and pre-mixed gases (Airgas, Inc., Radnor, Pa.) containing HCl, $SO_2$, NO, $CO_2$, $O_2$, and $N_2$. Flow rate through the sample tubes were 750 ml/min, reactor temperature was 150° C., and concentrations of the gases were as follows: $SO_2$ 400 ppm, HCl 3 ppm, NO 300 ppm, $O_2$ 6% by volume, $CO_2$ 12% by volume, $H_2O$ 10% by volume, elemental Hg ($Hg^o$) was about 16-18 ug/$Nm^3$ (16-18 ppb by weight), balanced with $N_2$. Samples were evaluated for mercury absorption for about 2 to 3 hours. Concentration of mercury was measured using a PS Analytical, Galahad Mercury Analyzer (Kent, England) with a mercury speciation module for measuring elemental mercury concentration and total mercury concentration.

Results in Table 2 show that the zeolite compounds were effective in removing mercury from a simulated flue gas stream. The zeolite compounds disclosed herein may, in accordance with the invention, be disposed as a coating on a flow-through substrate, such as a honeycomb, which may be used for the capture of heavy metals such as mercury, from a fluid stream. The zeolite compounds disclosed herein may also, in accordance with the invention, be distributed homogeneously throughout a flow-through substrate, such as a honeycomb, which may be used for the capture of heavy metals such as mercury, from a fluid stream.

It should be understood that while the invention has been described in detail with respect to certain illustrative embodiments thereof, it should not be considered limited to such, as numerous modifications are possible without departing from the broad spirit and scope of the invention as defined in the appended claims.

We claim:

1. A method for removing a heavy metal from a fluid, the method comprising:
   providing a flow-through substrate comprising a zeolite impregnated with a chelating compound; and
   contacting the fluid comprising a heavy metal with the flow-through substrate.

2. The method of claim 1, wherein the flow-through substrate is essentially free of activated carbon.

3. The method of claim 1, wherein the flow-through substrate is essentially free of sulfur.

4. The method of claim 1, wherein the zeolite is disposed as a coating on the flow-through substrate.

5. The method of claim 1, wherein the zeolite is selected from A-type zeolite, X-type zeolite, Y-type zeolite, L-type zeolite, ZSM-5 and combinations thereof.

6. The method of claim 1, wherein the zeolite has a cation selected from hydrogen, sodium, ammonium, potassium, calcium, and iron.

7. The method of claim 1, wherein the contacting occurs at 100° C. or higher.

8. The method of claim 1, wherein the fluid is a combustion product of a fossil fuel plant.

9. The method of claim 1, further comprising, oxidizing at least a portion of the heavy metal in the fluid prior to contacting the fluid with the flow-through substrate.

10. The method of claim 1, wherein the zeolite has a $SiO_2$/$Al_2O_3$ mole ratio of 5 or more.

11. The method of claim 1, wherein the chelating compound is an organic chelate.

12. The method of claim 11, wherein the organic chelate is EDTA.

* * * * *